United States Patent

Nakano

(10) Patent No.: US 9,534,968 B2
(45) Date of Patent: Jan. 3, 2017

(54) FAULT DETECTION METHOD

(71) Applicant: HINO MOTORS, LTD., Tokyo (JP)

(72) Inventor: Hitoshi Nakano, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 442 days.

(21) Appl. No.: 14/356,727

(22) PCT Filed: Dec. 19, 2012

(86) PCT No.: PCT/JP2012/008095
§ 371 (c)(1),
(2) Date: May 7, 2014

(87) PCT Pub. No.: WO2013/094188
PCT Pub. Date: Jun. 27, 2013

(65) Prior Publication Data
US 2014/0321499 A1   Oct. 30, 2014

(30) Foreign Application Priority Data

Dec. 22, 2011 (JP) ................................. 2011-281078

(51) Int. Cl.
*B60T 7/12* (2006.01)
*G01K 15/00* (2006.01)
(Continued)

(52) U.S. Cl.
CPC ........... *G01K 15/007* (2013.01); *F02D 41/222* (2013.01); *F02M 26/49* (2016.02); *G01M 99/002* (2013.01);
(Continued)

(58) Field of Classification Search
CPC ... F02M 26/28; F02M 26/33; F02D 2021/083; F02D 2041/0075; F02D 41/22; F01N 11/007
(Continued)

(56) References Cited

U.S. PATENT DOCUMENTS

2004/0084030 A1* 5/2004 Matsunaga ......... F02D 41/0072
123/568.12
2004/0194917 A1* 10/2004 Usui ........................ F01P 3/14
165/51

(Continued)

FOREIGN PATENT DOCUMENTS

JP          64 35064       2/1989
JP         11 166452       6/1999
(Continued)

OTHER PUBLICATIONS

U.S. Appl. No. 14/398,823, filed Nov. 4, 2014, Nakano.
International Search Report Issued Mar. 26, 2013 in PCT/JP12/008095 Filed Dec. 19, 2012.

*Primary Examiner* — John Kwon
(74) *Attorney, Agent, or Firm* — Oblon, McClelland, Maier & Neustadt, L.L.P.

(57) ABSTRACT

With a precondition that a cooling water temperature sensor 16 and an intercooler exit gas temperature sensor 18 have been determined normal, whether an EGR cooler efficiency calculated is within a normal range is determined. When within the normal range, whether there is divergence between a calculation value of an intake temperature to be detected by an intake manifold gas temperature sensor 19 and an actual detection value of the sensor 19 is determined. When not in the normal range, whether the calculation value is excessively low is determined; and, just like the above, whether there is divergence between the calculation value and the actuation detection value of the intake manifold gas temperature sensor 19 is determined. Based on the determinations categorized, whether the EGR cooler 14, EGR gas temperature sensor 17 and intake manifold gas temperature sensor 19 are normal is determined.

2 Claims, 2 Drawing Sheets

(51) Int. Cl.
*G01M 99/00* (2011.01)
*F02D 41/22* (2006.01)

(52) U.S. Cl.
CPC . *F02D 2200/021* (2013.01); *F02D 2200/0414* (2013.01); *F02D 2400/08* (2013.01); *F02M 26/05* (2016.02); *F02M 26/28* (2016.02); *F02M 26/47* (2016.02); *Y02T 10/40* (2013.01)

(58) Field of Classification Search
USPC ............ 701/101, 108, 114, 115; 123/568.11, 123/568.12; 73/114.69, 114.71, 114.74
See application file for complete search history.

(56) References Cited

U.S. PATENT DOCUMENTS

| | | | |
|---|---|---|---|
| 2008/0184974 A1* | 8/2008 | Kobayashi | F02M 26/26 123/568.12 |
| 2009/0133385 A1* | 5/2009 | Ono | F01N 9/002 60/277 |
| 2011/0251825 A1 | 10/2011 | Nagoshi | |
| 2013/0199178 A1* | 8/2013 | Kanou | F01K 7/22 60/605.2 |

FOREIGN PATENT DOCUMENTS

| | | |
|---|---|---|
| JP | 2001 164999 | 6/2001 |
| JP | 2006 90204 | 4/2006 |
| JP | 2010 151039 | 7/2010 |

\* cited by examiner

FAULT DETECTION METHOD

TECHNICAL FIELD

The present invention relates to a fault detection method for use in an internal combustion engine.

BACKGROUND ART

Conventionally with respect to, for example, a vehicle engine, so-called exhaust gas recirculation (EGR) has been employed in which part of exhaust gas is extracted from an exhaust side and is returned to an intake side as EGR gas which suppresses combustion of fuel in the engine and lowers a combustion temperature, thereby reducing $NO_x$ generated.

Generally, in order to conduct such kind of exhaust gas recirculation, a position in an exhaust passage extending from an exhaust manifold to an exhaust pipe is connected to a position in an intake passage extending from an intake pipe to an intake manifold by an EGR pipe for recirculation of the EGR gas therethrough.

The EGR pipe may be equipped midway thereof with a water-cooled EGR cooler since cooling, midway of the EGR pipe, of the EGR gas to be recirculated to the engine will drop a temperature of and reduce a volume of the EGR gas to lower a combustion temperature without substantial decrease in output of the engine, thereby effectively suppressing generation of NO (nitrogen oxides).

On the other hand, on-board fault diagnosis equipment called OBD system (On Board Diagnostic System) may be boarded on a vehicle nowadays such that the vehicle itself may detect and monitor any fault (sudden malfunction) of exhaust emission control equipment, make alarm display of any occurring fault to a driver and store particulars of the fault.

A prior art reference for such kind of technique for detecting any characteristic fault of a sensor is, for example, the following Patent Literature 1 by the same applicant as that of the present invention.

CITATION LIST

Patent Literature

[Patent Literature 1] JP 2010-151039A

SUMMARY OF INVENTION

Technical Problems

Since exhaust emission control technique is to be further highly refined from now, it has been demanded to determine whether any characteristic fault is occurring with respect to an EGR gas temperature sensor for detection of a gas temperature at an exit of the EGR cooler and an intake manifold gas temperature sensor for detection of an intake manifold gas temperature at an entry of an intake manifold. It is, however, difficult to accurately determine whether any characteristic fault is occurring in the EGR gas temperature sensor and in the intake manifold gas temperature sensor.

Specifically, technique employed up to the present for determination on any characteristic fault of sensors is that occurrence of characteristic fault is determined when a very unlikely value is indicated under a specific operational condition. However, with respect to the EGR gas temperature sensor and intake manifold gas temperature sensor as mentioned in the above, undeniable is a possibility that the abnormal value is outputted under influence of deterioration with time of the EGR cooler arranged upstream. Thus, it has been difficult to accurately determine occurrence of fault in any of the EGR gas temperature sensor, intake manifold gas temperature sensor and EGR cooler.

The deterioration with time of the EGR cooler mentioned in the above refers to lowered heat exchange efficiency due to accumulation with time of soot contained in exhaust gas on an inner periphery of a heat-transfer tube of the EGR cooler (generally, the EGR cooler is in the form of a shell-and-tube heat exchanger).

The invention was made in view of the above and has its object to provide a fault detection device which can accurately determine fault on any of an EGR gas temperature sensor, an intake manifold gas temperature sensor and an EGR cooler.

Solution to Problems

The invention is directed to a fault detection method characterized by providing, at a same position, two cooling water temperature sensors for temperature detection of cooling water entering into an EGR cooler and confirming that detection values of said cooling water temperature sensors are the same to thereby determine said cooling water temperature sensors to be normal;

determining an intercooler exit gas temperature sensor to be normal when a detection value of the intercooler exit gas temperature sensor for temperature detection of intake air having passed through an intercooler is not excessively high during low load operation and is not excessively low during high load operation;

using, as a precondition, a fact that the cooling water temperature sensor and the intercooler exit gas temperature sensor are determined to be normal;

calculating an EGR cooler efficiency on the basis of a calculation value of an exhaust temperature at an entry of the EGR cooler calculated from a revolution frequency and a load of an engine, an actual detection value of an EGR gas temperature sensor for temperature detection of exhaust at an exit of the EGR cooler and the actual detection value of said cooling water temperature sensors;

when said EGR cooler efficiency calculated is within a normal range, actually detecting a temperature of the intake air mixed with EGR gas and guided to an intake manifold by an intake manifold gas temperature sensor and calculating a temperature of the intake air to be detected by said intake manifold gas temperature sensor on the basis of a current EGR ratio, the actual detection value of the EGR gas temperature sensor and the actual detection value of the intercooler exit gas temperature sensor to thereby determine the intake manifold gas temperature sensor to be in characteristic fault if there is divergence between the calculation value and the actual detection value of the intake manifold gas temperature sensor and determine the EGR cooler, EGR gas temperature sensor and intake manifold gas temperature sensor to be normal if there is no divergence; and when the EGR cooler efficiency calculated is not within the normal range, determining whether said EGR cooler efficiency calculated is excessively low or not to thereby determine the EGR gas temperature sensor to be in characteristic fault if said EGR cooler efficiency calculated is not excessively low; and, if said EGR cooler efficiency calculated is excessively low, calculating the temperature of the intake air to be detected by said intake manifold gas temperature sensor just like the above to thereby determine the EGR gas temperature sensor to be in characteristic fault if there is divergence between the calculation value and the actual detection value of said intake manifold gas temperature sensor and determine the EGR gas temperature sensor and intake manifold gas temperature sensor to be normal and determine the EGR cooler to be in fault if there is no divergence.

Thus, in this manner, when the detection values of the two cooling water temperature sensors provided at the same position are the same, the cooling water temperature sensors are determined to be normal since the two cooling water temperature sensors are hardly deemed to be concurrently in characteristic fault.

Moreover, when the detection value of intercooler exit gas temperature sensor is not excessively high during the low load operation and is not excessively low during the high load operation, the detection value of the intercooler exit gas temperature sensor is deemed to be within a normal range, so that the intercooler exit gas temperature sensor is determined to be normal.

The fact that the detection value of the intercooler exit gas temperature sensor is not excessively high during the low load operation and is not excessively low during the high load operation means that the detection value at a predetermined detecting point in a low load operation range does not exceed a threshold set to a temperature as high as is predicable not to be detected at said detecting point, and the detection value at the predetermined detecting point in a high load operation range does not fall below a threshold set to a temperature as low as is predicable not to be detected at said detecting point.

Such normality determination of the cooling water temperature sensors and intercooler exit gas temperature sensor is succeeded by categorization depending on the EGR cooler efficiency calculated which in turn is succeeded by determination on whether there is divergence or not between the calculation value of the intake temperature to be detected by the intake manifold gas temperature sensor and the actual detection value of the intake manifold gas temperature sensor. As a result, it can be determined whether the EGR cooler, EGR gas temperature sensor and intake manifold gas temperature sensor are normal or not.

Specifically, the EGR cooler efficiency is calculated on the basis of the calculation value of the exhaust temperature at the entry of the EGR cooler calculated from the revolution frequency and load of the engine, the actual detection value of the EGR gas temperature sensor for detection of the exhaust temperature at the exit of the EGR cooler and the actual detection value of the cooling water temperature sensors, so that when the EGR cooler efficiency calculated is within the normal range, it can be deemed that the EGR cooler has no deterioration termed as fault and the actual detection value of the EGR gas temperature sensor is not abnormal.

Because, the cooling water temperature sensors have been determined to be normal, so that the EGR cooler efficiency calculated cannot be within the normal range unless the EGR cooler and EGR gas temperature sensor are normal.

As a result, if the actual detection value of the intake manifold gas temperature sensor, which is not utilized for the calculation of the EGR cooler efficiency, diverges from the calculation value of the intake temperature to be detected by the intake manifold gas temperature sensor, only the intake manifold gas temperature sensor is determined to be in characteristic fault; if there is no divergence, all of the EGR cooler, EGR gas temperature sensor and intake manifold gas temperature sensor are determined to be normal.

If the EGR cooler efficiency calculated is not within the normal range, whether the EGR cooler efficiency calculated is excessively low or not is determined. If the EGR cooler efficiency calculated is not so excessively low as to assume that the EGR cooler has fault deterioration (deterioration resulting in functional failure), it can be deemed that abnormal is the actual detection value of the EGR gas temperature sensor used for calculation of the EGR cooler efficiency.

Here, even if the EGR cooler efficiency calculated is so excessively low as to assume that the EGR cooler has fault deterioration, there also remains a possibility that the EGR gas temperature sensor has characteristic fault. Thus, just like the above, determination is made on whether there is divergence or not between the calculation value and the actual detection value of the intake manifold gas temperature sensor, which makes it possible to determine whether the intake manifold gas temperature sensor has characteristic fault or the EGR cooler has fault deterioration.

Specifically, now that the EGR cooler efficiency calculated is not within the normal range, it cannot be deemed that only the actual detection value of the intake manifold gas temperature sensor which is not used for calculation of the EGR cooler efficiency is abnormal and it is also hard to deem that both of the intake manifold gas temperature sensor and the EGR gas temperature sensor concurrently have characteristic fault. Thus, under the conditions that the EGR cooler efficiency calculated is not within the normal range and that the EGR cooler efficiency is so excessively low as to assume that the EGR cooler has fault deterioration, if there is divergence between the calculation value and the actual detection value of the intake manifold gas temperature sensor, then it can be deemed that the actual detection value of the EGR gas temperature sensor used for calculation of the calculation value is abnormal.

Because, the intercooler exit gas temperature sensor has been determined to be normal, so that there is no divergence between the calculation value and the actual detection value of the intake manifold gas temperature sensor unless abnormal is the actual detection value of the EGR gas temperature sensor.

Thus, when there is no divergence between the calculation value and the actual detection value of the intake manifold gas temperature sensor, it can be deemed that the actual detection value of the EGR gas temperature sensor used for calculation of said calculation value is normal, so that the EGR cooler is determined to be in fault deterioration which is a remaining reason for the EGR cooler efficiency calculated being not within the normal range, and the EGR gas temperature sensor and intake manifold gas temperature sensor are determined to be normal.

Further, it is preferable in the invention that at the cold start of the engine the fact that the detection values of the intercooler exit gas temperature sensor, intake manifold gas temperature sensor and EGR gas temperature sensor are the same is confirmed as precondition.

Specifically, at the cold start of the engine, the engine is utterly cold so that control giving priority to warm-up is made with the EGR valve being closed, so that all of the detected temperatures of the intercooler exit gas temperature sensor, intake manifold gas temperature sensor and EGR gas temperature sensor are not to be different from ambient temperature. By confirming that the respective detection values are the same, detection accuracy in a low temperature range can be confirmed beforehand.

Advantageous Effects of Invention

According to a fault detection method of the invention, the following excellent effects can be obtained.

(I) Bearing in mind a possibility of detection values being abnormal under the influence of deterioration with time of an EGR cooler, it can be accurately determined any fault of an EGR gas temperature sensor, intake manifold gas temperature sensor and EGR cooler. Establishment of such fault detection method can contribute to formulation of an OBD system (On Board Diagnostic system) corresponding to exhaust emission control technique which is expected to be further highly refined from now.

(II) If, at cold start of the engine, a fact that detection values of an intercooler exit gas temperature sensor, intake manifold gas temperature sensor and EGR gas temperature sensor are the same is confirmed as precondition, detection accuracy in the intercooler exit gas temperature sensor, intake manifold gas temperature sensor and EGR gas temperature sensor in a low temperature range can be confirmed beforehand, which can contribute to realization of more reliable detection of characteristic fault.

DESCRIPTION OF EMBODIMENT

An embodiment of the invention will be described in conjunction with the drawings.

Figure 1:
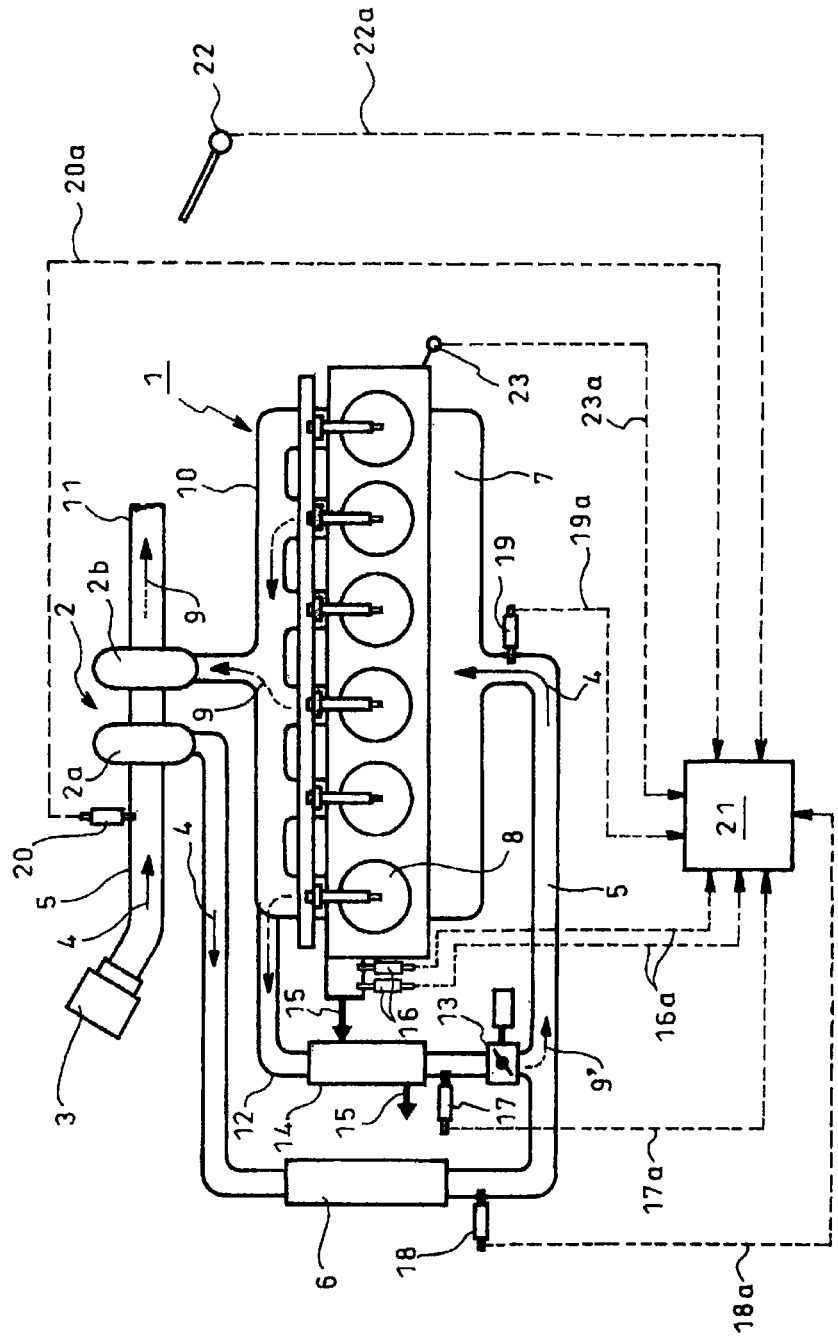
FIG. 1 is an overall schematic view showing an embodiment of the invention.

FIG. 1 shows the embodiment of the invention. In FIG. 1, reference numeral 1 denotes an engine with a turbocharger 2 having a compressor 2a to which intake air 4 from an air cleaner 3 is guided through an intake pipe 5. The intake air 4 compressed by the compressor 2a is guided to an intercooler 6 where the intake air 4 is cooled, and is further guided to an intake manifold 7 so as to be distributed to respective cylinders 8 of the engine 1.

Exhaust gas 9 discharged from the respective cylinders 8 of the engine 1 is guided through an exhaust manifold 10 to a turbine 2b of the turbocharger 2. After driving the turbine 2b, the exhaust gas 9 is discharged outside of a vehicle through an exhaust pipe 11.

An end of the exhaust manifold 10 in a lined-up direction of the cylinders 8 is connected through an EGR pipe 12 with the intake pipe 5 downstream of the intercooler 6 so as to extract part of the exhaust gas 9 as EGR gas 9' from the exhaust manifold 10 into the intake pipe 5.

The EGR pipe 12 is provided with an EGR valve 13 for proper opening and closing of the EGR pipe 12 and with an EGR cooler 14 for cooling of the EGR gas 9' flowing through the EGR pipe 12. In the EGR cooler 14, the EGR gas 9' can be lowered in temperature through heat exchange with cooling water 15 guided from the engine 1.

A temperature of the cooling water 15 flowing into the EGR cooler 14 is detected by two cooling water temperature sensors 16 arranged in a same location on a front portion of the engine 1. An temperature of the exhaust at an exit of the gas EGR cooler 14 is detected by an EGR gas temperature sensor 17. A temperature of the intake air 4 having passed through the intercooler 6 is detected by an intercooler exit gas temperature sensor 18. A temperature of the intake air 4 mixed with the EGR gas 9' and guided to the intake manifold 7 is detected by an intake manifold gas temperature sensor 19. A temperature of the intake air 4 (fresh air) guided from the air cleaner 3 is detected by an intake temperature sensor 20.

Detection signals 16a, 17a, 18a, 19a and 20a from the cooling water temperature sensor 16, EGR gas temperature sensor 17, intercooler exit gas temperature sensor 18, intake manifold gas temperature sensor 19 and intake temperature sensor 20, respectively, are inputted to a controller 21 constituting an engine control computer (ECU: Electronic Control Unit).

Also inputted to the controller 21 are a detection signal 22a from an accelerator sensor 22 for detecting an accelerator opening degree as load of the engine 1 as well as a detection signal 23a from a rotation sensor 23 for detecting rotational frequency of the engine 1.

Figure 2:
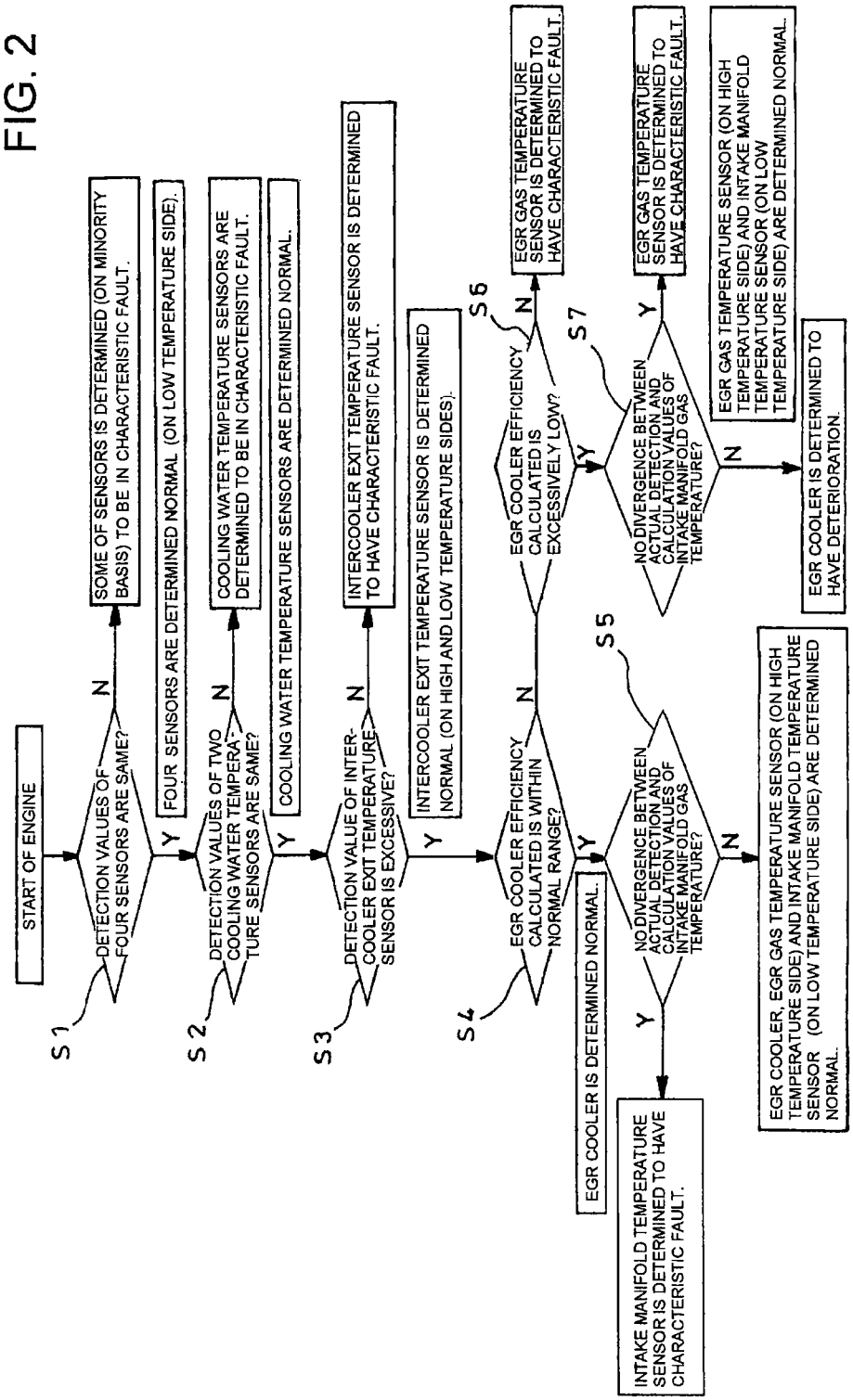
FIG. 2 is a flowchart showing specific determination steps conducted by the controller of FIG. 1.

In the controller 21, as shown in FIG. 2 in the form of the flowchart, determination steps proceed to determine whether the EGR cooler 14, EGR gas temperature sensor 17 and intake manifold gas temperature sensor 19 are normal or not.

First, at cold start of the engine 1, in step S1, the fact that detection values of the intercooler exit gas temperature sensor 18, intake manifold gas temperature sensor 19 and EGR gas temperature sensor 17 are the same is confirmed as precondition.

Specifically, at the cold start of the engine 1, the engine 1 is utterly cold so that control giving priority to warm-up is made with the EGR valve 13 being closed. Since all of detected temperatures by the intercooler exit gas temperature sensor 18, intake manifold gas temperature sensor 19 and EGR gas temperature sensor 17 are not to be different from ambient temperature, detection accuracy in a low temperature range is confirmed beforehand by confirming that the respective detection values are the same.

In this case, a detection value of the intake temperature sensor 20 upstream in the intake pipe 5 is to be also the same, so that it is preferable to also confirm the detection value of the intake temperature sensor 20. It can be deemed that majority sensors with the detection values being the same are normal and that a minority with different detection value has characteristic fault.

After it is confirmed that detected temperatures by the four sensors (the intercooler exit gas temperature sensor 18, intake manifold gas temperature sensor 19, EGR gas temperature sensor 17 and intake temperature sensor 20) are the same in past step S1, it proceeds to next step S2 where determination is made on whether the detection values of the two cooling water temperature sensors 16 are the same or not. If the detection values are different from each other, the cooling water temperature sensors 16 are determined to have characteristic fault; if the detection values are the same, the cooling water temperature sensors 16 are determined to be normal.

Specifically, if the detection values of the two cooling water temperature sensors 16 at the same position are the same, the cooling water temperature sensors are determined to be normal since the two cooling water temperature sensors 16 are hardly deemed to concurrently have characteristic fault.

If the cooling water temperature sensors 16 are determined to be normal in step S2, it proceeds to next step S3 where the intercooler exit gas temperature sensor 18 is determined to be normal in a case where the detection value of the intercooler exit gas temperature sensor 18 for detection of the temperature of the intake air 4 having passed through the intercooler is not excessively high during a low load operation and is not excessively low during a high load operation.

Specifically, if the detection value of the intercooler exit gas temperature sensor 18 is not excessively high during the low load operation and is not excessively low during the high load operation, then the detection value of the intercooler exit gas temperature sensor 18 is deemed to be within a normal range so that the intercooler exit gas temperature sensor 18 is determined to be normal.

The fact that the detection value of the intercooler exit gas temperature sensor 18 is not excessively high during the low load operation and is not excessively low during the high load operation means that the detection value at a predetermined detecting point in a low load operation range does not exceed a threshold set to a temperature as high as is predicable not to be detected at the detecting point and does not fall below a threshold set to a temperature as low as is predicable not to be detected at the detecting point.

Then, with the precondition that the cooling water temperature sensor 16 and intercooler exit gas temperature sensor 18 are determined to be normal, it proceeds to next step S4 where the EGR cooler efficiency is calculated on the basis of a calculation value of exhaust temperature at the entry of the EGR cooler 14 calculated from a revolution frequency and a load of the engine 1, the actual detection value of the EGR gas temperature sensor 17 for detection of the exhaust temperature at the exit of the EGR cooler 14 and the actual detection value of the cooling water temperature sensors 16, and determination is made on whether the EGR cooler efficiency calculated is within the normal range or not.

Here, the EGR cooler efficiency is calculated by the following equation (1):

$$\text{EGR cooler efficiency} = (T_{GEGRIN} - T_{GEGROUT}) / (T_{GEGRIN} - T_{WEGRCIN}) \times 100 \quad (1)$$

where $T_{GEGRIN}$ denotes an exhaust temperature at entry of the EGR cooler; $T_{GEGROUT}$, an exhaust temperature at exit of the EGR cooler; and $T_{WEGRCIN}$, a temperature of cooling water entering into the EGR cooler.

If the EGR cooler efficiency calculated from the equation (1) is within a normal range, it can be deemed that the EGR cooler 14 has no deterioration termed as fault and that the actual detection value of the EGR gas temperature sensor 17 is also normal.

Because, the normality of the cooling water temperature sensor 16 has been determined, so that the EGR cooler efficiency calculated cannot be within a normal range unless the EGR cooler 14 and the EGR gas temperature sensor 17 are normal.

As a result, when the EGR cooler efficiency calculated is within the normal range, it proceeds to step S5 where the temperature of the intake air 4 mixed with the EGR gas 9' and guided to the intake manifold 7 is actually detected by the intake manifold gas temperature sensor 19 and an intake temperature to be detected by the intake manifold gas temperature sensor 19 is calculated on the basis of the current EGR ratio, the actual detection value and the actual detection values of the EGR gas temperature sensor 17 and intercooler exit gas temperature sensor 18; and determination is made on whether the actual detection value of the intake manifold gas temperature sensor 19 which is not used as calculation of the EGR cooler efficiency diverges from the calculation value of the intake temperature to be detected by the intake manifold gas temperature sensor 19 or not. If there is divergence, only the intake manifold gas temperature sensor 19 is determined to have characteristic fault; and if there is no divergence, all of the GR cooler 14, EGR gas temperature sensor 17 and intake manifold gas temperature sensor 19 are determined to be normal.

Here, the intake temperature to be detected by the intake manifold gas temperature sensor 19 is calculated from the following equation (2):

$$\text{Intake temperature to be detected by the intake manifold gas temperature sensor 19} = (\text{EGR ratio} \times (T_{GEGROUT} - T_{GICOUT})) + T_{GICOUT} \quad (2)$$

where $T_{GEGROUT}$ denotes an exhaust temperature at exit of the EGR cooler; and $T_{GICOUT}$, an intake temperature at exit of the intercooler.

As to the EGR ratio used for the equation (2), for example, a volume of each of the cylinders 8 is multiplied by the revolution frequency of the engine 1 and by a pump efficiency to obtain a suction flow rate of the engine 1 from which subtracted is the actual detection value of the intake temperature sensor 20 (fresh air amount) to obtain a recirculation amount of the EGR gas 9'. A fraction of which a numerator is the recirculation amount and a denominator is the suction flow rate may be used as EGR ratio.

In the determination of past step S4, if the EGR cooler efficiency calculated is not within the normal range, it proceeds to step S6 where whether the EGR cooler efficiency calculated is excessively low or not is determined.

In this connection, determination whether the EGR cooler efficiency calculated is excessively low or not may be made by determining whether the EGR cooler efficiency is so excessively low as to assume that the EGR cooler 14 has fault deterioration (deterioration resulting in functional failure), using the threshold. The threshold used may be properly selected depending on a flow rate of the EGR gas 9' flowing through the EGR cooler 14.

Then, if the EGR cooler efficiency is not so excessively low as to assume that the EGR cooler 14 has fault deterioration, the actual detection value of the EGR gas temperature sensor 17 used for calculation of the EGR cooler efficiency can be deemed to be abnormal, so that the EGR gas temperature sensor 17 is determined to have characteristic fault.

Here, even if the EGR cooler efficiency is so excessively low as to assume that the EGR cooler 14 has fault deterioration, there still remain a possibility that the EGR gas temperature sensor 17 has characteristic fault, so that, just as mentioned in the above, determination is made on whether the actual detection value of the intake manifold gas temperature sensor 19 diverges from the calculation value. As a result, it can be determined whether the intake manifold gas temperature sensor 19 has characteristic fault or the EGR cooler 14 has fault deterioration.

Specifically, now that the EGR cooler efficiency calculated is not within the normal range, it cannot be deemed that only the actual detection value of the intake manifold gas temperature sensor 19, which is not used for calculation of the EGR cooler efficiency, is abnormal and it is hardly deemed that both of the intake manifold gas temperature sensor 19 and the EGR gas temperature sensor 17 concurrently have characteristic fault. Thus, if the EGR cooler efficiency calculated is not within the normal range and the EGR cooler efficiency is so excessively low as to assume that the EGR cooler 14 has fault deterioration, determination is made in next step S7 on whether the actual detection value of the intake manifold gas temperature sensor 19 diverges from the calculated value. If there is divergence, the actual detection value of the EGR gas temperature sensor 17 used for calculation of the calculation value can be deemed to be abnormal, so that the EGR gas temperature sensor 17 is determined to have characteristic fault.

Because, normality of the intercooler exit gas temperature sensor 18 has been determined, so that the actual detection value of the intake manifold gas temperature sensor 19 does not diverge from the calculated value unless the actual detection value of the EGR gas temperature sensor 17 is abnormal.

And, if there is no divergence between the actual detection value and the calculation value of the intake manifold gas temperature sensor 19, the actual detection value of the EGR gas temperature sensor 17 used for calculation of the calculation value can be deemed to be normal, so that the EGR cooler 14 is determined to be in fault due to deterioration which is a remaining reason for the EGR cooler efficiency calculated being not within the normal range, and the EGR gas temperature sensor 17 and the intake manifold gas temperature sensor 19 are determined to be normal.

Thus, according to the above embodiment, bearing in mind the possibility of the detection value being abnormal under the influence of deterioration with time of the EGR cooler 14, abnormality of any of the EGR gas temperature sensor 17, intake manifold gas temperature sensor 19 and EGR cooler 14 can be accurately determined. Establishment of such fault detection method can contribute to formulation of an OBD system (On Board Diagnostic system) corresponding to exhaust emission control technique which is expected to be further highly refined from now.

Especially in the embodiment, at cold start of the engine 1, the fact that detection values of the intercooler exit gas temperature sensor 18, intake manifold gas temperature sensor 19 and EGR gas temperature sensor 17 are the same is confirmed as precondition, so that detection accuracy in the intercooler exit gas temperature sensor 18, intake manifold gas temperature sensor 19 and EGR gas temperature sensor 17 in the low temperature range can be confirmed beforehand, which can contribute to realization of more reliable detection of characteristic fault.

It is to be understood that a fault detection method according to the invention is not limited to the above embodiment and that various changes and modifications may be made without departing from the scope of the invention.

REFERENCE SIGNS LIST

1 engine
4 intake air
6 intercooler
7 intake manifold
9 exhaust gas
9' EGR gas
14 EGR cooler
15 cooling water
16 cooling water temperature sensor
16*a* detection signal
17 EGR gas temperature sensor
17*a* detection signal
18 intercooler exit gas temperature sensor
18*a* detection signal
19 intake manifold gas temperature sensor
19*a* detection signal

The invention claimed is:

1. A fault detection method comprising
providing, at a same position, two cooling water temperature sensors for temperature detection of cooling water entering into an EGR cooler and confirming that detection values of said cooling water temperature sensors are the same to thereby determine said cooling water temperature sensors to be normal;
determining an intercooler exit gas temperature sensor to be normal when a detection value of the intercooler exit gas temperature sensor for temperature detection of intake air having passed through an intercooler is not excessively high during low load operation and is not excessively low during high load operation;
using, as a precondition, a fact that the cooling water temperature sensor and the intercooler exit gas temperature sensor are determined to be normal;
calculating an EGR cooler efficiency on the basis of a calculation value of an exhaust temperature at an entry of the EGR cooler calculated from a revolution frequency and a load of an engine, an actual detection value of an EGR gas temperature sensor for temperature detection of exhaust at an exit of the EGR cooler and the actual detection value of said cooling water temperature sensors;
when said EGR cooler efficiency calculated is within a normal range, actually detecting a temperature of the intake air mixed with EGR gas and guided to an intake manifold by an intake manifold gas temperature sensor and calculating a temperature of the intake air to be detected by said intake manifold gas temperature sensor on the basis of a current EGR ratio, the actual detection value of the EGR gas temperature sensor and the actual detection value of the intercooler exit gas temperature sensor to thereby determine the intake manifold gas temperature sensor to be in characteristic fault if there is divergence between the calculation value and the actual detection value of the intake manifold gas temperature sensor and determine the EGR cooler, EGR gas temperature sensor and intake manifold gas temperature sensor to be normal if there is no divergence; and
when the EGR cooler efficiency calculated is not within the normal range, determining whether said EGR cooler efficiency calculated is excessively low or not to thereby determine the EGR gas temperature sensor to be in characteristic fault if said EGR cooler efficiency calculated is not excessively low; and, if said EGR cooler efficiency calculated is excessively low, calculating the temperature of the intake air to be detected by said intake manifold gas temperature sensor just like the above to thereby determine the EGR gas temperature sensor to be in characteristic fault if there is divergence between the calculation value and the actual detection value of said intake manifold gas temperature sensor and determine the EGR gas temperature sensor and intake manifold gas temperature sensor to be normal and determine the EGR cooler to be in fault if there is no divergence.

2. The fault detection method as claimed in claim 1, wherein, at cold start of the engine, a fact that detection values of the intercooler exit gas temperature sensor, intake manifold gas temperature sensor and EGR gas temperature sensor are the same is confirmed as precondition.

* * * * *